3,404,950
MANUFACTURE OF AMMONIUM SULFAMATE
Nobuo Sasaki and Hideyuki Sugahara, Omuta, Tetsuya Maehara, Takada-machi, Kazuo Tsutsumi, Omuta, and Yoshiaki Egami, Yamato-gun, Fukuoka, Japan, assignors to Toyo Koatsu Industries, Incorporated, Tokyo, Japan, a corporation of Japan
Filed Apr. 28, 1965, Ser. No. 451,505
Claims priority, application Japan, Oct. 20, 1964, 39/59,305
10 Claims. (Cl. 23—114)

ABSTRACT OF THE DISCLOSURE

Ammonium sulfamate can be continuously produced from ammonium imidosulfonate suspended in an inert heat-transfer medium by heating under a high ammonia atmosphere to produce ammonium sulfamate, which is separated from the medium at a temperature above the melting point of ammonium sulfamate.

---

This invention relates to a process for continuously producing ammonium sulfamate from ammonium imidosulfonate and more particularly to a process for continuously producing ammonium sulfamate through ammonium imidosulfonate from ammonia and sulfur trioxide.

It is known to produce amonium sulfamate by heating ammonium imidosulfonate under an ammonia pressure. However, as ammonium imidosulfonate is a solid, it is impossible to continuously feed it to a reactor kept at a high pressure. Further, in order to keep ammonium imidosulfonate in a molten state, it is necessary to make its temperature higher than 280° C. It is substantially impossible from the viewpoint of the pressure pump to continuously feed such high temperature melt to a reaction tube kept at a high pressure.

An object of the present invention is to provide a process for continuously producing ammonium sulfamate from ammonium imidosulfonate.

Another object of the present invention is to provide a process for continuously producing ammonium sulfamate from ammonium imidosulfonate with little corrosion of the apparatus.

Another object of the present invention is to provide a process for producing ammonium sulfamate through ammonium imidosulfonate from ammonia and sulfur trioxide.

The process for continuously producing ammonium sulfamate according to the present invention comprises suspending ammonium imidosulfonate in an inert medium selected from the class consisting of mineral oils, animal and vegetable oils and heat transfer medium oils, feeding the thus-obtained slurry into a high pressure reactor, heating it under an ammonia pressure to produce ammonium sulfamate, mixed with the medium, keeping the mixture from the reactor above the melting point of the ammonium sulfamate to separate the mixture into a layer of the inert medium and a layer of the ammonium sulfamate melt, collecting the ammonium sulfamate and circulating the layer of the inert medium to use it to suspend ammonium imidosulfonate.

The inert medium to be used to suspend ammonium imidosulfonate in the present invention is selected from mineral oils, animals oils, vegetable oils and such heat-transfer media as diphenyl and diphenyl oxide, for example, Dowtherm A, which is an eutectic mixture of diphenyl and diphenyl oxide sold by Dow Chemical Co. The heat-transfer media is inert to ammonium imidosulfonate, ammonium sulfamate and and ammonia and is of a boiling point of about 100 to 400° C. and a flash point of about 50 to 350° C. The most suitable among them is a machine oil from the viewpoints of the viscosity and coloring of the ammonium sulfamate obtained. The preferred amount of the medium is 2 to 7 specifically 2.5 to 5 times by weight of the ammonium imidosulfonate.

The reaction pressure is preferably 30 to 50 kg./cm.$^2$ and the preferable reaction temperature is 230 to 260° C. The preferred amount of ammonia to be used is 2 to 3 mols per mol of ammonium imidosulfonate.

The medium has a tendency to deteriorate when used as circulated. However, this deterioration can be remarkably reduced by passing an inert gas through the medium or eliminating air by purging the reactor with an inert gas or gaseous ammonia after suspending ammonium imidosulfonate in the medium.

The inert gas to be used is selected from nitrogen and argon, although ammonia is preferable.

Ammonium imidosulfonate is produced by reacting a gas containing sulfur trioxide and ammonia in a gas phase at a mol ratio of $SO_3$ to $NH_3$ of preferably 1 to 1.6–1.8 at a temperature of 250 to 350° C. Therefore, ammonium sulfamate can be continuously obtained through ammonium imidosulfonate from ammonia and sulfur trioxide by contacting a gas suspending ammonium imidosulfonate from a reaction tube with a medium so that the ammonium imidosulfonate is suspended in the medium, feeding the resulting suspension into a high pressure reactor continuously as described above and heating it under an ammonia pressure to form ammonium sulfamate.

The present invention shall be explained in the following with reference to the accompanying drawings in which.

Figure 1:
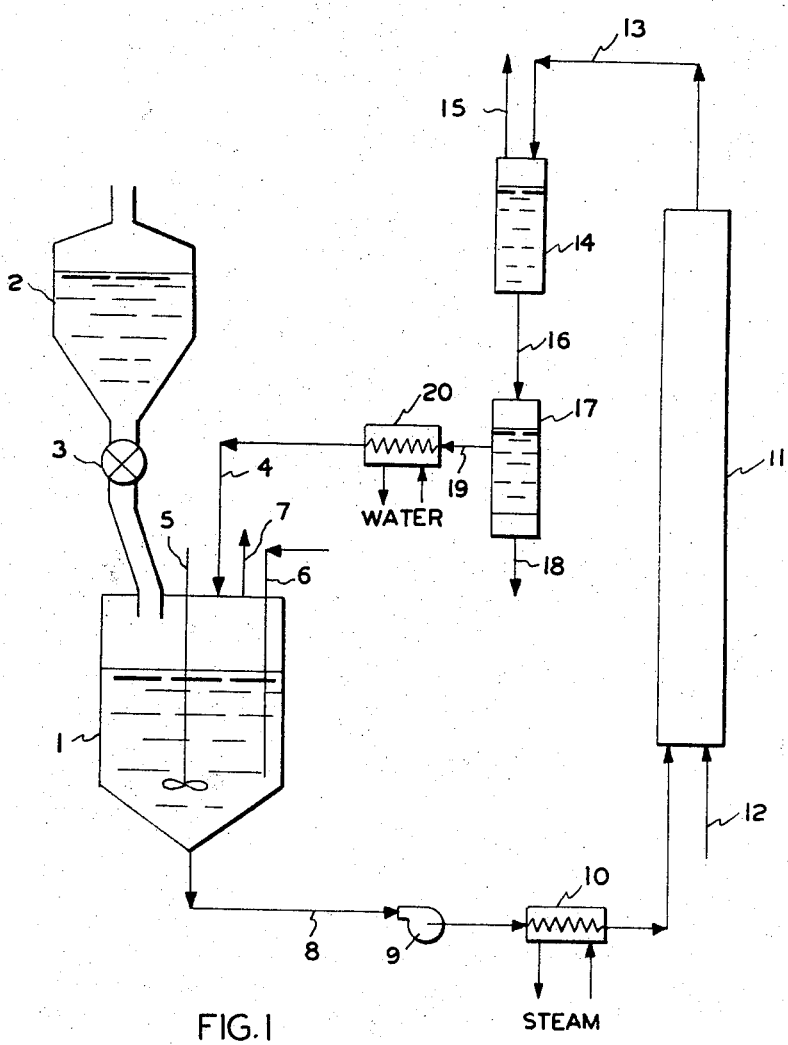
FIGURE 1 shows diagrammatically a process for producing ammonium sulfamate from ammonium imidosulfonate.

In FIGURE 1, into a slurry preparing tank 1 are introduced ammonium imidosulfonate through a feed valve 3 from a raw material storage tank 2 and an inert medium through a pipe 4 and they are stirred with a stirrer 5 to form a slurry. An inert gas or gaseous ammonia is introduced through a pipe 6 so that the interior of the slurry preparing tank is placed in an inert gas or gaseous ammonia atmosphere. 7 is an outlet pipe for the inert gas or gaseous ammonia. The temperature in the slurry preparing tank is kept usually below about 100° C. The slurry prepared is compressed with a slurry pump 9 through a pipe 8, is preheated with steam in a preheater 10 and is introduced into a high pressure reactor 11. Into the high pressure reactor is fed ammonia through a pipe 12. The high pressure reactor is kept at a pressure of about 30 to 50 kg./cm.$^2$ and a temperature of about 230 to 260° C. In the reactor, the ammonium imidosulfonate reacts with the ammonia to form ammonium sulfamate. The reaction product is decompressed and is introduced into a gas-liquid separator 14 through a pipe 13. Excess ammonia is there separated as a gas from the liquid layer and is taken out through a pipe 15. The liquid layer is fed to a separating tank 17 through a pipe 16 and is there separated into a layer of the inert medium and a layer of ammonium sulfamate melt. The layer of ammonium sulfamate melt is taken out through a pipe 18 and is made a product as a granular form or as further purified. It is preferable that the temperature of the liquid layer in the gas-liquid separator 14 and the separating tank 17 is about 130 to 160° C. The layer of the inert medium separated in the separating tank 17 is introduced into a cooler 20 through pipe 19, is there cooled with water and is circulated to the slurry preparing tank 1 through the pipe 4.

Figure 2:
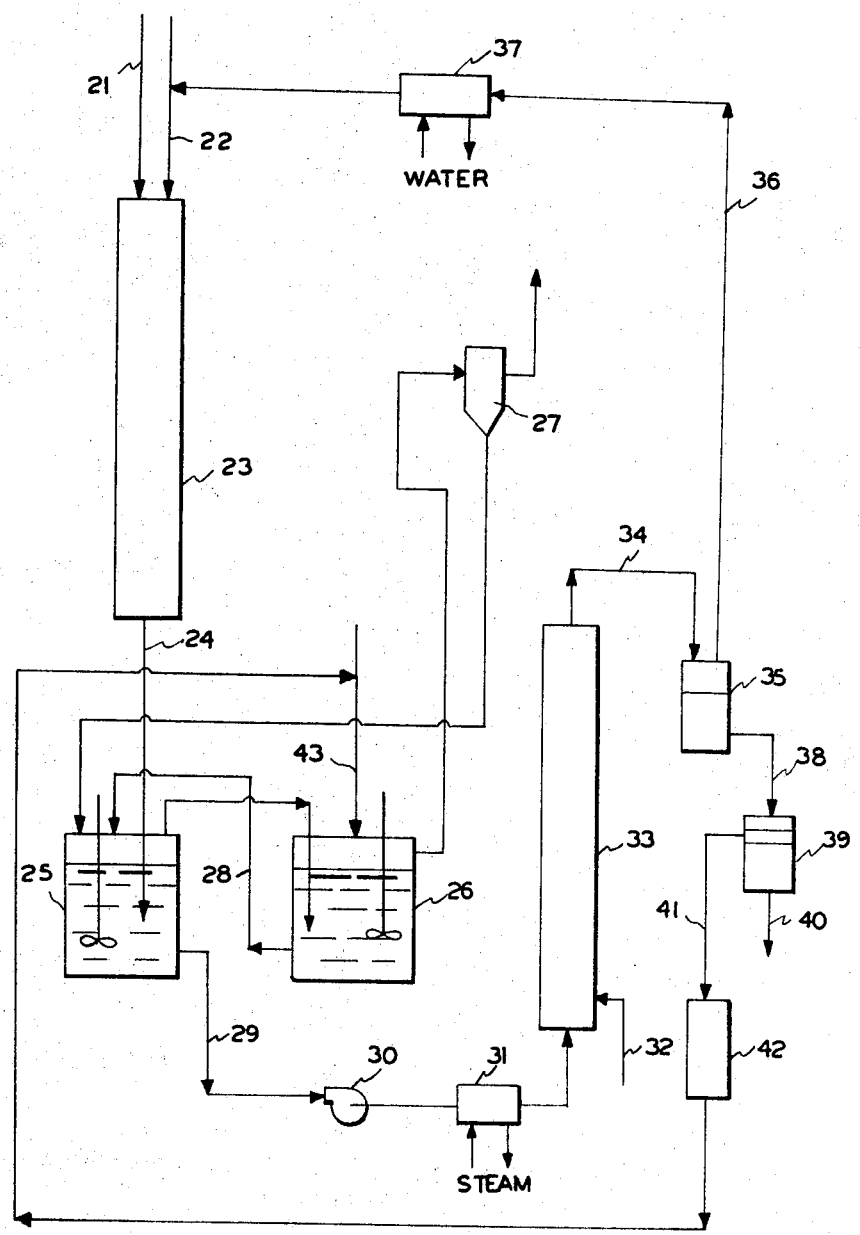
FIGURE 2 shows diagrammatically a process for producing ammonium sulfamate through ammonium imidosulfonate from ammonia and sulfur trioxide.

The process for continuously producing ammonium sulfamate from ammonium imidosulfonate from ammonia and sulfur trioxide shall now be explained with reference to FIGURE 2. Into a reaction tube 23 are introduced such gas containing sulfur trioxide as sulfur trioxide diluted with a nitrogen gas or a gas discharged from a sulfur dioxide converter in the contact type sulfuric acid plant through a pipe 21 and ammonia through a pipe 22. In this case, the preferred mol ratio of $SO_3$ to $NH_3$ is 1 to 1.6–1.8 and the reaction temperature is preferably about 250 to 350° C. In the reaction tube 23, the sulfur trioxide and ammonia react with each other to produce ammonium imidosulfonate. The ammonium imidosulfonate produced is introduced together with the accompanying gas into a first collecting tank 25 containing an inert medium through a pipe 24 to collect ammonium imidosulfonate in the inert medium. The ammonium imidosulfonate not collected in the first collecting tank is fed to a second collecting tank 26 which is similar to the first collecting tank. The ammonium imidosulfonate not collected in the second collecting tank is separated from the accompanying gas in a solid collector 27 and is returned to the first collecting tank 25. Between the first and second collecting tanks is fixed a pipe 28 for transferring the inert medium in the second collecting tank to the first collecting tank. The number of the collecting tanks is not limited to two but may be increased or decreased. Further, a scrubbing column may be used instead of the first and second collecting tanks and the solid collector. The ammonium imidosulfonate suspended in the inert medium is compressed with a pressure pump 30 through a pipe 29 from the bottom part of the first collecting tank 25, is heated with steam in a preheater 31 and is introduced into a high pressure reactor 33. The preferred amount of the inert medium is 2 to 7, especially 2.5 to 5 times by weight of the ammonium imidosulfonate. Ammonia is introduced into the high pressure reactor 33 through a pipe 32. The high pressure reactor is kept at a pressure of 30 to 50 atmospheres and a temperature of 230 to 260° C. to convert ammonium imidosulfonate to ammonium sulfamate. In this case, the preferable amount of ammonia is 2 to 3 mols per mol of ammonium imidosulfonate. The reaction mixture from the high pressure reactor 33 is decompressed and is then fed to a gas-liquid separator 35 through a pipe 34 so that the ammonia gas is separated from the liquid. The ammonia separated the gas-liquid separator 35 is cooled with water in an ammonia cooler 37 through a pipe 36 and is introduced, together with fresh ammonia into the reaction tube 23 through the pipe 22. The mixture of the reaction product and medium from the gas-liquid separator is fed to a separating tank 39 through a pipe 38 and is left standing so as to be separated into a layer of the inert medium and a layer of the reaction product (consisting mostly of ammonium sulfamate) by the difference between their specific gravities. The preferred temperature of the mixture in the separating tank 39 is 130 to 160° C. The layer of the reaction product is taken out through a pipe 40 and is made a product as a granular form of crude ammonium sulfamate or, as purified by utilizing the difference of solubilities of ammonium sulfamate, ammonium imidosulfonate and ammonium sulfate in aqueous ammonia solution. The medium separated in the separating tank 39 is introduced into a cooler 42 through a pipe 41 cooled with water in the cooler 42 and is introduced together with a fresh medium into the second collecting tank 26 through a pipe 43.

The following examples are presented to illustrate the invention but are not to be construed as limiting. In the examples, percent is by weight and "Nl." is used to denote liters at normal temperature and pressure.

EXAMPLE 1

Ammonium imidosulfonate of 0.08% $SO_3$, 90.85% $(NH_4SO_3)_2NH$, 6.98% $NH_4SO_3NH_2$ and 2.09%

$(NH_4)_2SO_4$ at a rate of 4.3 kg./hr. and machine oil 120 containing no rust preventive at a rate of 11.7 kg./hr. were introduced into a slurry preparing tank of a capacity of 30 liters and were stirred to form a slurry. The temperature of the slurry preparing tank was kept at 50° C. The slurry obtained was compressed to 30 kg./cm.² with a slurry pump and was introduced at a rate of 160 kg./hr. into a high pressure reactor 22 mm. in the inside diameter, 9,000 mm. high and made of SUS 27. On the other hand, ammonia was introduced into the high pressure reactor at a rate of 0.62 kg./hr. The temperature of the high pressure reactor was kept at 230° C. and pressure at 30 kg./cm.². The mixture of the reaction product and machine oil 120 from the high pressure reactor was decompressed and introduced into a gas-liquid separator wherein gaseous ammonia was separated from a liquid phase at a rate of 0.285 kg./hr. On the other hand, the liquid phase consisted of a layer of machine oil 120 at 11.46 kg./hr. and a layer of ammonium sulfamate at 4.5 kg./hr. The oil layer was circulated together with 0.24 kg./hr. of fresh machine oil 120 to the slurry preparing tank. The ammonium sulfamate obtained was of a purity of 86.36% and contained 4.61% ammonium imidosulfonate, 8.65% ammonium sulfate and 0.38% of other impurities.

EXAMPLE 2

The operation was the same as in Example 1 except that the ammonia was passed through the slurry at a rate of 0.5 m.³/hr. to place the interior of the slurry preparing tank in an ammonia gas atmosphere.

The ammonium sulfamate obtained was of a purity of 88.52% and contained 4.64% ammonium imidosulfonate, 6.53% ammonium sulfate and 0.31% of other impurities. When the machine oil 120 was tested after the continuous operation for 24 hours, its viscosity was 31 centipoises at 50° C. and the residual carbon was 0.24%. No substantial deterioration was seen therein as compared with a viscosity of 29.2 centipoises at 50° C. and a residual carbon content of 0.22% in fresh machine oil 120.

EXAMPLE 3

Corrosion tests of various materials was carried out to presume the corrosion of the apparatus in the process of the present invention. Respective test pieces of 20 x 50 x 3 mm. of titanium, lead, SUS 32, SUS 33, SUS 27 and SUS 22 were suspended in a shaking type autoclave of a capacity of 500 cc. made of SUS 27. 345 g. of ammonium imidosulfonate were put into the autoclave. The temperature therein was kept at 230° C. The pressure was made 30 kg./cm.² with ammonia. After 6 hours, the weight reduction by corrosion of each test piece was measured (Experiment I). In the case of the tests under the conditions of the process of the present invention, 100 g. of ammonium imidosulfonate, machine oil 120 (containing no rust preventive) in amounts by weight 3 times (Experiment II) and 5 times (Experiment III) of ammonium imidosulfonate was put in the autoclave same as in Experiment I. The test pieces same as Experiment I was suspended in the autoclave. The temperature was kept at 230° C., the pressure was made 30 kg./cm.² with ammonia. After 6 hours the weight reduction by corrosion of each test piece was measured. The results were as in Table I. It could be expected that, according to the process of the present invention, the corrosion in the high pressure reactor would be remarkably reduced.

TABLE I

| Materials | Weight reduction by corrosion (g./m.²) | | |
| --- | --- | --- | --- |
| | Experiment I | Experiment II | Experiment III |
| Titanium | 0.5 | 2.7 | 1.1 |
| Lead | 247 | 23 | 6.3 |
| SUS 32 [1] | 359 | 63 | 61.5 |
| SUS 33 [2] | 375 | 23 | 3.5 |
| SUS 27 [3] | 715 | 29 | 16.6 |
| SUS 22 [4] | 1,436 | 36 | 19.2 |
| Steel [5] | 1,604 | 85 | 12.3 |

[1] SUS 32 is chromium-nickel steel corresponding to AISI 316.
[2] SUS 33 is chromium-nickel steel corresponding to AISI 316L.
[3] SUS 27 is chromium-nickel steel corresponding to AISI 304.
[4] SUS 22 is chromium steel corresponding to AISI 403.
[5] Steel containing 0.08–0.18% of C, less than 0.35% of Si, 0.25–0.60% of Mn, less than 0.04% of P, less than 0.04% S and less than 0.20% Cu.

EXAMPLE 4

Into a reaction tube 50 mm. in the inside diameter, 1,380 mm. high and made of glass were fed a gas containing 7.0% $SO_3$, 0.3% $SO_2$, about 9.0% $O_2$ and 83.7% $N_2$ and discharged from a sulfur dioxide converter in a contact type sulfuric acid plant at a rate of 600 Nl./hr. and gaseous ammonia at a rate of 67 Nl./hr. so as to react with each other. The temperature in the upper part of the reaction tube was 250 to 280° C. The ammonium imidosulfonate produced was introduced together with the accompanying gas into a first collecting tank, second collecting tank and solid collector in sequence and was there collected with machine oil 120 containing no rust preventive. The machine oil was fed to the second collecting tank at a rate of 1.0 liter/hr. The slurry of ammonium imidosulfonate in the machine oil in the second collecting tank was fed to the first collecting tank at a rate of 1.023 liters/hr., was taken out of the bottom part of the first collecting tank at a rate of 1.120 liters/hr., was compressed to 30 atmospheres with a plunger pump and was fed into a high pressure reactor 12 mm. in the inside diameter, 8,860 mm. high and made of stainless steel SUS 33. On the other hand, ammonia was fed into the high pressure reaction tube at a rate of 32.2 g./hr. and the temperature in the reactor was kept at 230° C. The mixture of the reaction product and machine oil from the high pressure reactor was decompressed and fed to a gas-liquid separator wherein ammonia was separated at 20.8 Nl./hr. The ammonia separated was cooled and fed together with 46.2 Nl./hr. of fresh ammonia into the reaction tube for ammonium imidosulfonate production. On the other hand, the mixture from the gas-liquid separator was fed to a separating tank at a temperature of about 130 to 160° C. so as to be there separated into a layer of the machine oil and a layer of ammonium sulfamate melt by the difference between their specific gravities. The ammonium sulfamate separated in the separating tank at 200 gr./hr. was of a purity of about 87% and contained about 2% ammonium imidosulfonate, about 10.5% ammonium sulfate and about 0.5% of other impurities. The machine oil separated in the separating tank at 0.98 liter/hr. was cooled and was then fed together with 0.02 liter/hr. of fresh machine oil to the second collecting tank.

What is claimed is:

1. A continuous process for the production of ammonium sulfamate from ammonium imidosulfonate comprising forming a slurry by mixing ammonium imidosulfonate and an inert suspending medium selected from the group consisting of mineral oils, animal oils, vegetable oils and heat-transfer media, heating the slurry in a high pressure ammonia atmosphere and separating the resulting ammonium sulfamate from said suspending medium at a temperature above the melting point of ammonium sulfamate.

2. A process claimed in claim 1 wherein the amount of the suspending medium is 2 to 7 times by weight of ammonium imidosulfonate.

3. A process claimed in claim 1 wherein the suspending medium is of a boiling point of 100 to 400° C. and a flash point of 50 to 350° C.

4. A process claimed in claim 1 wherein the mixing is conducted in an atmosphere selected from the group consisting of nitrogen, argon and ammonia.

5. A process claimed in claim 1 wherein the ammonia pressure is 30 to 50 kg./cm.² and the temperature in the high pressure atmosphere is 230 to 260° C.

6. A process claimed in claim 1 wherein the suspending medium is a machine oil.

7. A process for continuously producing ammonium sulfamate from ammonium imidosulfonate produced from ammonia and sulfur trioxide comprising reacting ammonia with a sulfur trioxide containing gas selected from the group consisting of nitrogen and a mixture of nitrogen and oxygen in a gas phase to form ammonium imidosulfonate suspended in the gas; contacting in an ammonium imidosulfonate collecting zone, ammonium imidosulfonate suspended in the gas and an inert suspending medium selected from the group consisting of mineral oils, animal oils, vegetable oils and heat-transfer media to form a slurry of ammonium imidosulfonate in the suspending medium; heating the slurry in a high pressure reaction zone under an ammonia atmosphere to produce ammonium sulfamate suspended in the suspending medium; separating the suspending medium from the ammonium sulfamate at a temperature higher than the melting point of ammonium sulfamate and recycling the suspending medium to the ammonium imidosulfonate collecting zone to contact the suspending medium with ammonium imidosulfonate suspended in the gas.

8. A process claimed in claim 7 wherein the mol ratio of sulfur trioxide to ammonia is 1 to 1.6–1.8.

9. A process claimed in claim 7 wherein the amount of the suspending medium is 2 to 7.

10. A process claimed in claim 7 wherein the suspending medium is of a boiling point of 100 to 400° C. and a flash point of 50 to 350° C.

No references cited.

OSCAR R. VERTIZ, *Primary Examiner.*

EARL C. THOMAS, *Assistant Examiner.*